United States Patent
Yan et al.

(10) Patent No.: US 10,772,005 B2
(45) Date of Patent: *Sep. 8, 2020

(54) SYSTEMS AND METHODS FOR TRACKING AND CALCULATING NETWORK USAGE IN A NETWORK WITH MULTIPLE USER PLANE FUNCTIONS

(71) Applicant: Verizon Patent and Licensing Inc., Arlington, VA (US)

(72) Inventors: Lixia Yan, Basking Ridge, NJ (US); Marc Chiaverini, Randolph, NJ (US); Barry F. Hoffner, Bridgewater, NJ (US); Ho Yin Cheuk, Hoboken, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/526,420

(22) Filed: Jul. 30, 2019

(65) Prior Publication Data

US 2020/0022020 A1    Jan. 16, 2020

Related U.S. Application Data

(63) Continuation of application No. 15/961,680, filed on Apr. 24, 2018, now Pat. No. 10,412,625.

(51) Int. Cl.
| | |
|---|---|
| *H04W 28/02* | (2009.01) |
| *H04W 24/10* | (2009.01) |
| *H04W 76/11* | (2018.01) |
| *H04W 36/22* | (2009.01) |
| *H04W 48/06* | (2009.01) |
| *H04M 15/00* | (2006.01) |

(Continued)

(52) U.S. Cl.
CPC ....... *H04W 28/0289* (2013.01); *H04M 15/58* (2013.01); *H04W 24/10* (2013.01); *H04W 28/0242* (2013.01); *H04W 36/22* (2013.01); *H04W 48/06* (2013.01); *H04W 76/11* (2018.02); *H04W 8/18* (2013.01); *H04W 76/12* (2018.02); *H04W 88/06* (2013.01)

(58) Field of Classification Search
None
See application file for complete search history.

(56) References Cited

U.S. PATENT DOCUMENTS

| | | | |
|---|---|---|---|
| 2015/0133081 A1* | 5/2015 | Griot | H04M 15/00 455/407 |
| 2015/0333991 A1 | 11/2015 | Liu et al. | |

(Continued)

*Primary Examiner* — Christine T Duong

(57) ABSTRACT

A system described herein may provide a mechanism for accurately tracking data usage across multiple User Plane Function ("UPF") devices in a telecommunications network. For example, different types of traffic may be handled by UPFs (e.g., may be dropped or forwarded), and the UPFs may be able to report the dropping of specific types of traffic, without needing to perform deep packet inspection ("DPI"). Header information may be passed from an upstream UPF to a downstream UPF with the traffic, where the header information indicates rules and/or policies that were applied by the upstream UPF. The downstream UPF may identify the rules and/or policies from the upstream UPF, and may use this information when reporting usage to a Session Management Function ("SMF").

20 Claims, 10 Drawing Sheets

(51) Int. Cl.
    *H04W 8/18*     (2009.01)
    *H04W 88/06*     (2009.01)
    *H04W 76/12*     (2018.01)

(56) References Cited

U.S. PATENT DOCUMENTS

2016/0112896 A1*   4/2016   Karampatsis ..... H04W 28/0289
                                                                                               370/230.1
2018/0062962 A1    3/2018   Pignataro et al.

* cited by examiner

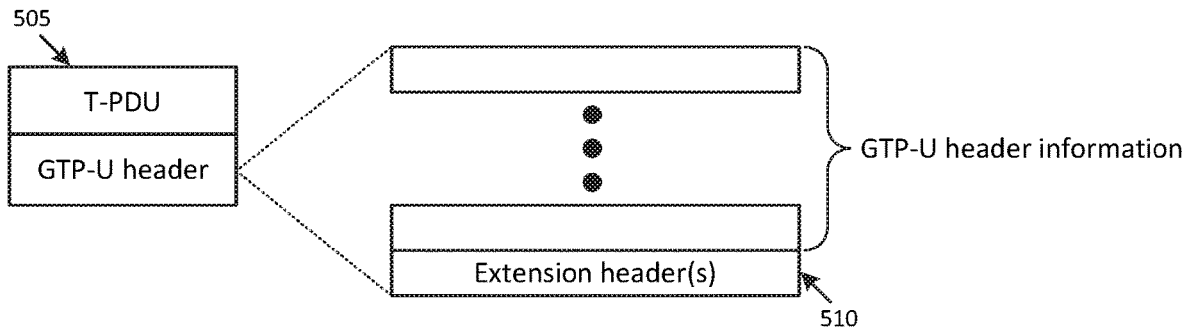
FIG. 5
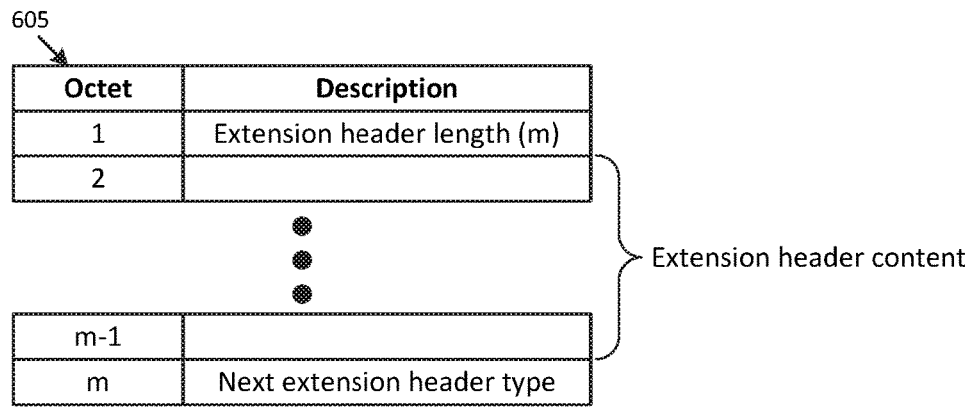
FIG. 6
| Octet | Description |
|---|---|
| 1 | 4 |
| 2 | URR1 |
| 3 | URR2 |
| 4 | [Next extension header type] |
FIG. 7

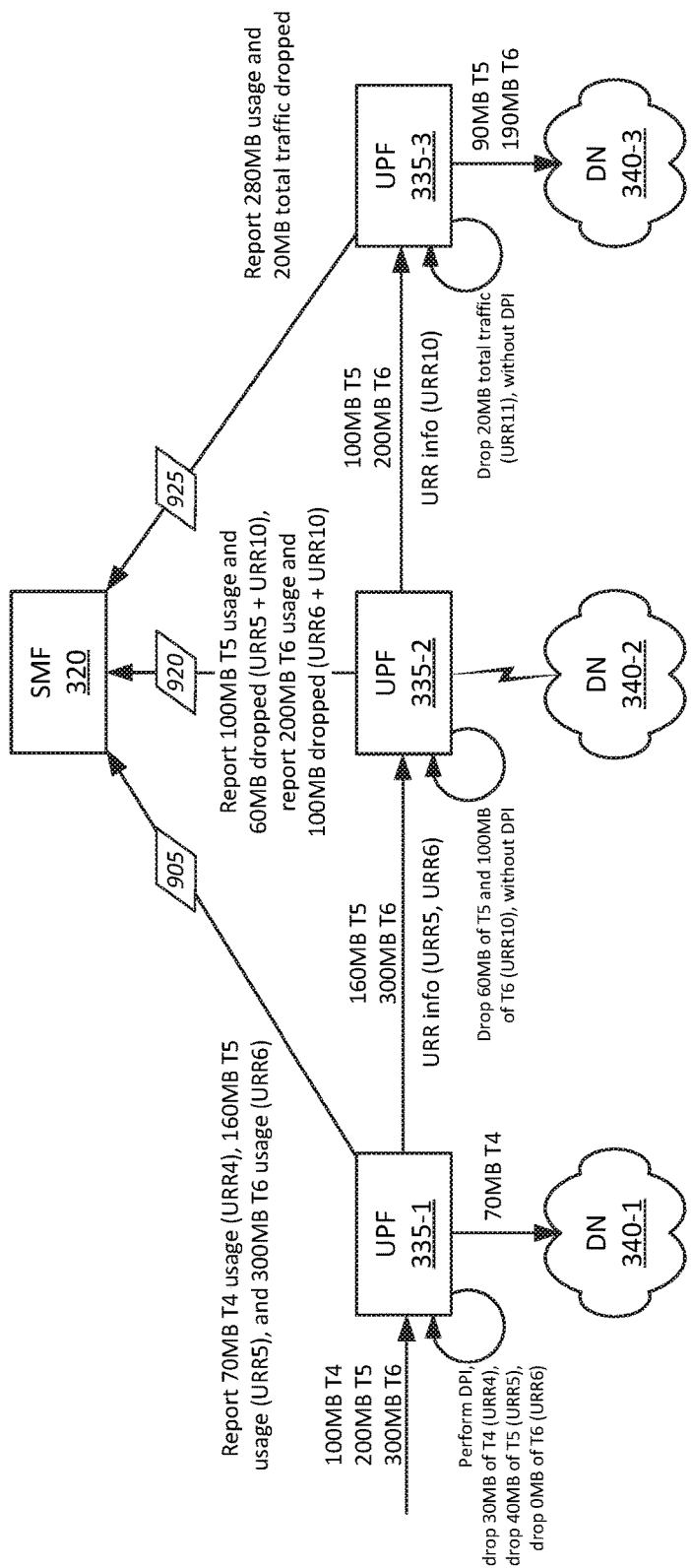

SYSTEMS AND METHODS FOR TRACKING AND CALCULATING NETWORK USAGE IN A NETWORK WITH MULTIPLE USER PLANE FUNCTIONS

CROSS-REFERENCE TO RELATED APPLICATION

This application is a Continuation of co-pending U.S. patent application Ser. No. 15/961,680, filed Apr. 24, 2018, titled "SYSTEMS AND METHODS FOR TRACKING AND CALCULATING NETWORK USAGE IN A NETWORK WITH MULTIPLE USER PLANE FUNCTIONS," the contents of which are hereby incorporated by reference.

BACKGROUND

Wireless telecommunications networks (e.g., Fifth Generation ("5G") networks) may send and/or receive traffic from multiple data networks ("DNs"). In such scenarios, the 5G network may include multiple User Plane Functions ("UPFs"), where one UPF handles traffic to and/or from one DN. Each UPF may have separate rules and/or policies to apply when handling traffic, which may result in differing traffic rates and/or amount of traffic transmitted via each of the UPFs.

BRIEF DESCRIPTION OF THE DRAWINGS

FIGS. 5-7 illustrate an example packet structure that may be used to indicate one or more URRs associated with traffic handled by one or more UPFs;

FIGS. 10A and 10B conceptually illustrate another use case, involving multiple UPFs, in which usage of multiple types of traffic may be accurately tracked and calculated.

DETAILED DESCRIPTION OF THE PREFERRED EMBODIMENTS

The following detailed description refers to the accompanying drawings. The same reference numbers in different drawings may identify the same or similar elements.

In some scenarios, a network provider (e.g., a wireless telecommunications network provider) may implement a system that includes multiple UPFs on the data path to handle user data. Systems and/or methods, as described herein, may provide for the accurate tracking, calculating, and reporting of usage of data in systems that include multiple UPFs. The systems and methods described herein may ensure that subscribers' accounts are accurately credited and debited for amounts of data usage, in contrast with other techniques (e.g., as described below with respect to FIGS. 2A and 2B) that require and utilize more resources, and lead to inaccuracies in account management than the techniques described herein.

Figure 1:
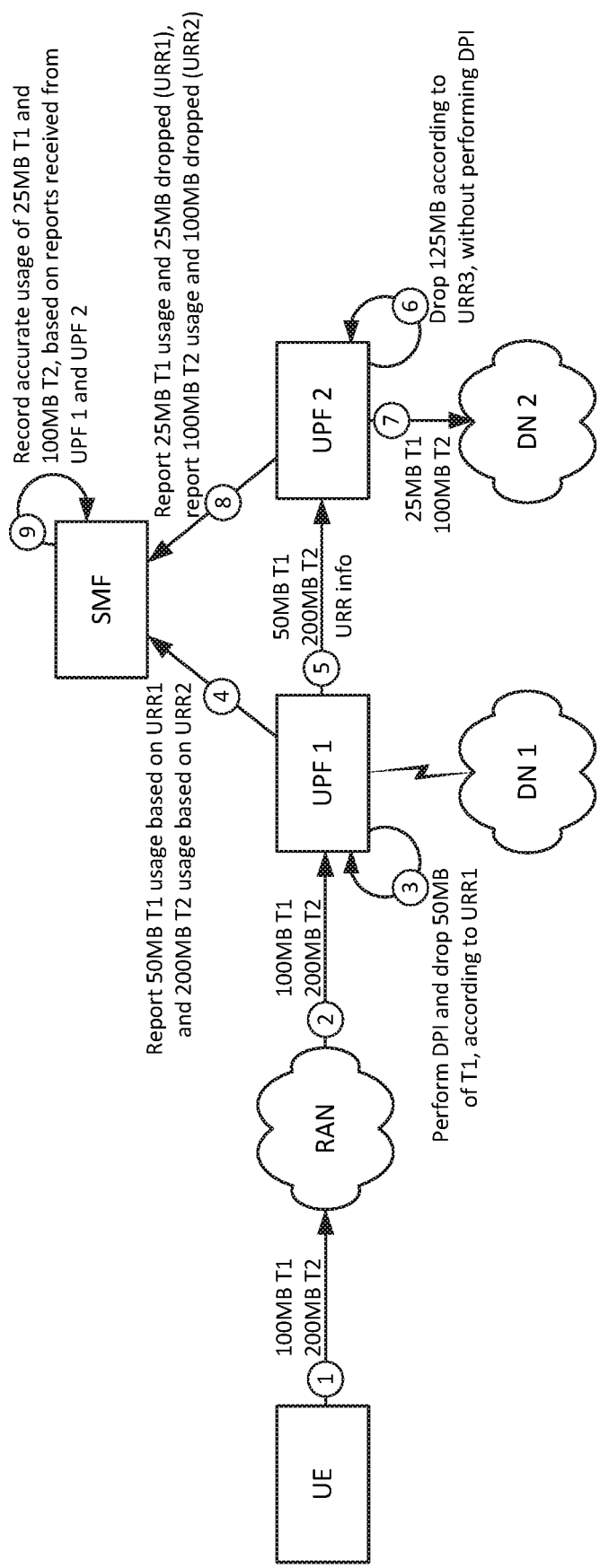
FIG. 1 illustrates an overview of one or more embodiments described herein.

Referring to FIG. 1, a user equipment ("UE"), such as a mobile telephone, may output (at 1) 300 megabytes ("MB") of data traffic over a given time period (e.g., to a radio access network ("RAN")). As shown, the data traffic may be conceptually separated into two different types: "T1" and "T2." The different "types" of traffic may be classified according to different attributes, such as different destinations (e.g., different destination Internet Protocol ("IP") addresses and/or ports), different sources (e.g., different source IP addresses and/or ports), may include data that relates to different applications, (e.g., voice data, video data, Internet browsing data, gaming application data, etc.), different application layer attributes (e.g., different attributes of the traffic that may be specified at the application layer), and/or may be considered as "different" traffic in some other way. In some embodiments, the different types may be identifiable by performing deep packet inspection ("DPI") on the traffic to identify IP header and/or IP payload information.

The RAN may output (at 2) the traffic to a first UPF ("UPF 1"). The UPF may execute one or more rules and/or policies (e.g., according to a subscriber profile associated with the UE) on the traffic. The rules and/or policies may, in some embodiments, have been received from the Session Management Function ("SMF"). As referred to herein, when used individually, the term "rule" may refer to a rule, a policy, and/or some other concept that describes how traffic should be treated based on the satisfaction of one or more conditions. As discussed herein, rules and/or polices, to be executed by UPFs, may be associated with URRs. For example, as shown in FIG. 1, UPF 1 may be associated with two example URRs: URR1 and URR2. In order to execute the URRs, UPF 1 may perform (at 3) DPI on the received traffic, to identify T1 and T2, and perform URR1 and URR2, respectively. In this example, URR1 may dictate that UPF 1 drop (at 3) 50 MB of the received 100 MB of T1, and not drop any of T2, prior to forwarding the traffic to its destination.

UPF 1 may report (at 4) 50 MB of T1 usage (or, more specifically, 50 MB of usage according to URR1) and 200 MB of T2 usage (or, more specifically, 200 MB of usage according to URR2). In some embodiments, UPF 1 may also report that 50 MB of T1 traffic was dropped (or, more specifically, that 50 MB of traffic was dropped according to URR1). The reporting may be done on a periodic basis (e.g., every half hour, every hour, etc.), on an intermittent basis, and/or on any other suitable basis. UPF 1 may report the usage to the SMF and/or one or more other devices or systems that track data usage.

When forwarding the traffic to UPF 2, UPF 1 may use a General Packet Radio Service ("GPRS") Tunneling Protocol ("GTP") tunnel, and may accordingly encapsulate the traffic into GTP packets. In accordance with some embodiments, UPF 1 may add GTP header data that indicates the URRs used by UPF 1 (i.e., URR1 and URR2, in this example). For example, in GTP traffic that includes T1 traffic (e.g., as identified by UPF 1 using DPI), the GTP header may include information indicating that the GTP traffic is associated with URR1. Similarly, in GTP traffic that includes T2 traffic, the GTP header may include information indicating that the GTP traffic is associated with URR2.

UPF 1 may forward (at 5) the traffic to UPF 2 via a GTP tunnel. As discussed above, the traffic may include URR information (e.g., in GTP headers). UPF 2 may execute a rule and/or policy ("URR3") relating to aggregate maximum bitrate ("AMBR") enforcement, which may not be dependent on traffic type. As URR3 is not dependent on traffic type, UPF 2 may enforce the AMBR rule by dropping (at 6) packets of T1 and/or T2, without needing to perform DPI. In this example, UPF 2 may drop 125 MB worth of packets. In this example, UPF 2 may end up dropping 25 MB of T1 packets and 100 MB of T2 packets; however, since the dropping is done without regard to traffic type, different amounts of T1 and/or T2 traffic may be dropped in other scenarios.

UPF 2 may forward (at 7) the traffic, which was not dropped, to Data Network ("DN") 2. That is, in this example, UPF 2 may forward 125 MB of traffic (i.e., 25 MB of T1 traffic and 100 MB of T2 traffic, in this example) to DN 2. When forwarding the traffic, UPF 2 may track and calculate the forwarded traffic based on the URR information received from UPF 1. For instance, UPF 2 may determine that 25 MB of traffic, which was received via GTP packets with a GTP header marked with URR1, was forwarded by UPF 2 to DN 2, and may also determine that 100 MB of traffic, which was received via GTP packets with a GTP header marked with URR2, was forwarded by UPF 2.

UPF 2 may report (at 8) the usage of 25 MB of T1 traffic and 100 MB of T2 traffic (i.e., as forwarded to DN 2). Specifically, UPF 2 may report that 25 MB of traffic, marked by UPF 1 as being associated with URR1 (e.g., in the GTP header), was used, and may report that 100 MB of traffic, marked by UPF 1 as being associated with URR 2, was used. Additionally, UPF 2 may report that 25 MB of traffic, marked by UPF 1 as being associated with URR1 (e.g., in the GTP header), was dropped, and may report that 100 MB of traffic, marked by UPF 1 as being associated with URR 2, was dropped.

Based on the usage reports from UPF 1 and UPF 2, the SMF may be able to accurately record (at 9) the usage of both T1 and T2 traffic types, without UPF 2 having had to perform DPI. Specifically, although 50 MB of T1 usage and 200 MB of T2 usage was reported by UPF 1, the SMF may correlate these to the reports of 25 MB of T1 usage and 25 MB of T1 dropped (i.e., 50 MB total T1 traffic handled by UPF 2) and 100 MB of T2 usage and 100 MB of T2 dropped (i.e., 200 MB total T2 traffic handled by UPF 2), to form a complete picture of the traffic outputted by UPF 1. Further, because these operations are performed based on information provided in GTP headers, UPF 2 does not need to perform DPI in order to report which specific types of traffic were dropped.

Figure 2A:
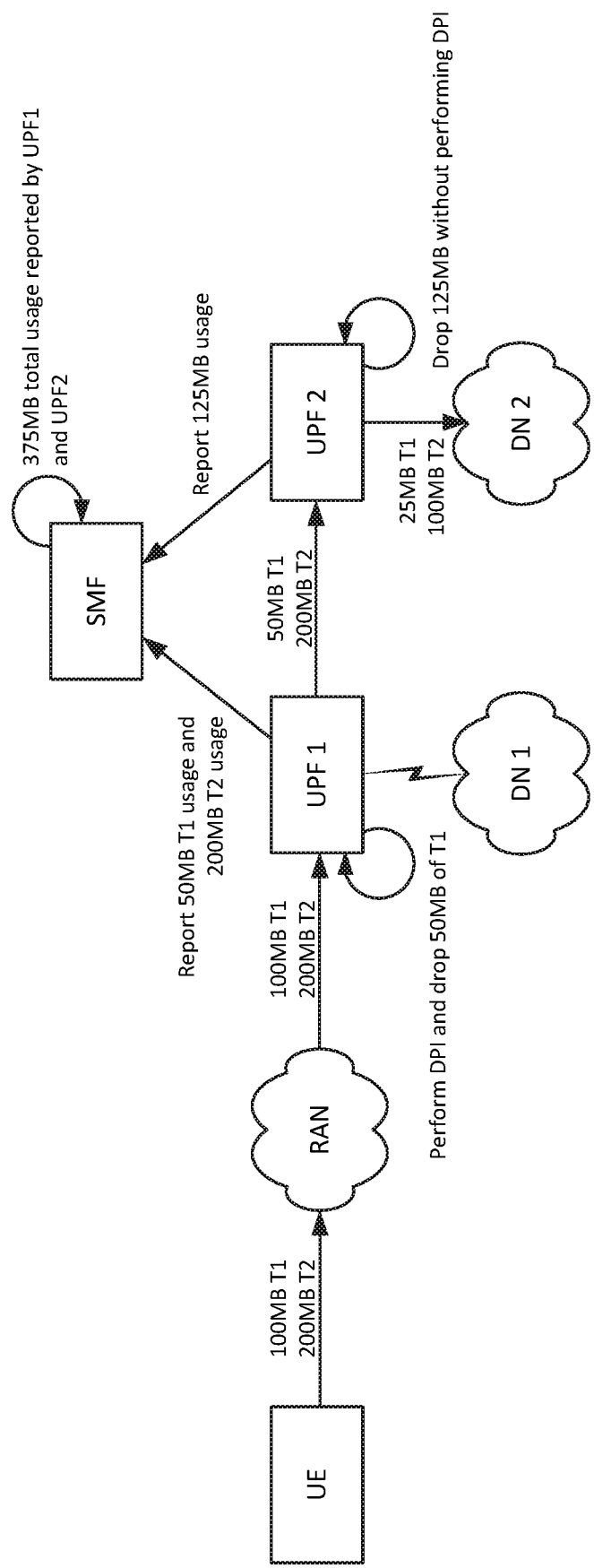
FIG. 2A illustrates an example situation in which usage data may be recorded inaccurately in a scenario where traffic traverses multiple UPFs.

FIG. 2A illustrates an example situation where usage may not accurately be tracked. The operations shown in FIG. 2A may be the same as shown in FIG. 1, with the omission of the URR information discussed in FIG. 1. Specifically, while the operations in FIG. 1 included URR information included in the GTP headers between UPF 1 and UPF 2, as well as in the reporting information to the SMF, the operations in FIG. 2A do not include such URR information. For instance, the UPFs of FIG. 2A do not add or remove URR information, and do not send URR information to the SMF. Additionally, the SMF of FIG. 2A is not configured to receive URR information and use the information to track and calculate usage based on URR information.

As shown in FIG. 2A, the UE may output 300 MB of traffic (100 MB T1 and 200 MB T2), which may be received by UPF 1. UPF 1 may perform DPI to identify the types of traffic (i.e., to identify T1 and T2 traffic), and drop 50 MB of T1 traffic before forwarding the traffic to UPF 2. UPF 1 may report 50 MB T1 usage, and 200 MB T2 usage. UPF 2 may drop 125 MB of the received traffic, without performing DPI. Due to not performing DPI, UPF 2 may not be able to determine how much of each type of traffic was dropped and/or how much traffic was forwarded from UPF 2.

Thus, when UPF 2 reports the usage to the SMF, UPF 2 may not be able to indicate how much of T1 or T2 traffic was forwarded by UPF 2. Instead, UPF 2 may simply report that 125 MB of traffic was forwarded. Based on these conflicting reports, the SMF may not be able to concretely determine the actual usage. Instead, the SMF may need to rely on heuristics which may have varying levels of reliability or accuracy. For example, the SMF may add the amounts together, to arrive at 375 MB used, which would potentially result in overcharging the subscriber's account for 350 MB of traffic. As another example, the SMF may select the higher amount of the two reports (i.e., 350 MB as reported by UPF 1, as opposed to 125 MB as reported by UPF 2), which would still result in over debiting the subscriber's account. The SMF may select the lower amount of the two reports (i.e., 125 MB as reported by UPF 2, as opposed 350 MB as reported by UPF 2). The latter technique would be correct in this scenario, but may result in under debiting the account in other scenarios (e.g., in a scenario where UPF 1 forwards some traffic to DN 1 and other traffic to UPF 2).

Figure 2B:
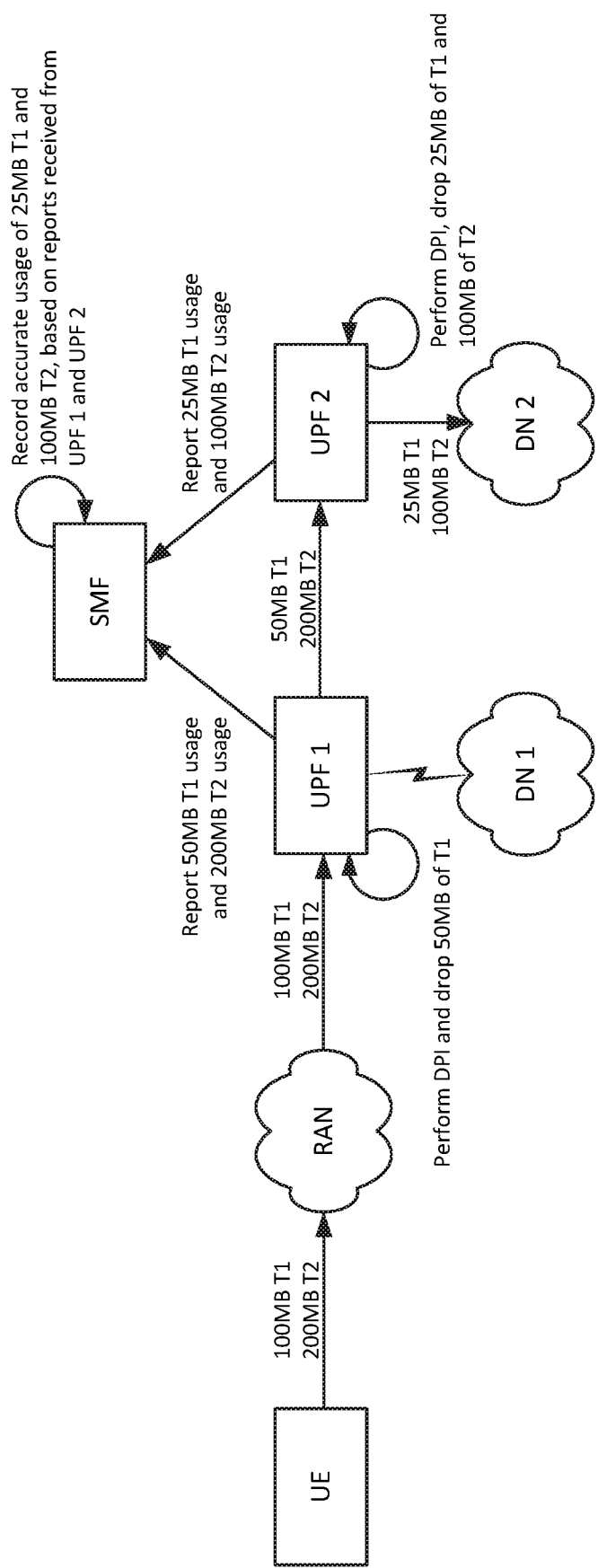
FIG. 2B illustrates an example situation in which usage data may recorded accurately in a scenario where traffic traverses multiple UPFs, using a technique that consumes more resources than the example shown in FIG. 1.

FIG. 2B illustrates an example situation where usage may be accurately tracked, but in a more resource-intensive technique than is shown in FIG. 1. For example, as similarly discussed in FIG. 1, UPF 1 of FIG. 2 may perform DPI, drop 50 MB of T1 traffic, forward 50 MB of T1 traffic to UPF 2, and forward 200 MB of T2 traffic to UPF 2. UPF 2 may perform DPI and drop 25 MB of T1 traffic, and may also drop 100 MB of T2 traffic. Because DPI was performed by UPF 2, UPF 2 may be able to identify that 25 MB of T1 traffic is forwarded from UPF 2, and that 100 MB of T2 traffic is forwarded from UPF 2. Because the SMF receives specific information from UPF 1 and UPF 2 regarding the traffic types that were forwarded by UPF 1 and UPF 2, it may be more feasible for the SMF to accurately track the usage based on the reports from UPF 1 and UPF 2.

However, performing DPI at both UPF 1 and UPF 2 is relatively costly, in terms of processing and/or other types of resources. In contrast, the approach described in FIG. 1 provides the benefit of accurately tracking the types and amounts of data that were forwarded by multiple UPFs, without necessitating that each UPF perform DPI, thereby conserving resources.

Figure 3:
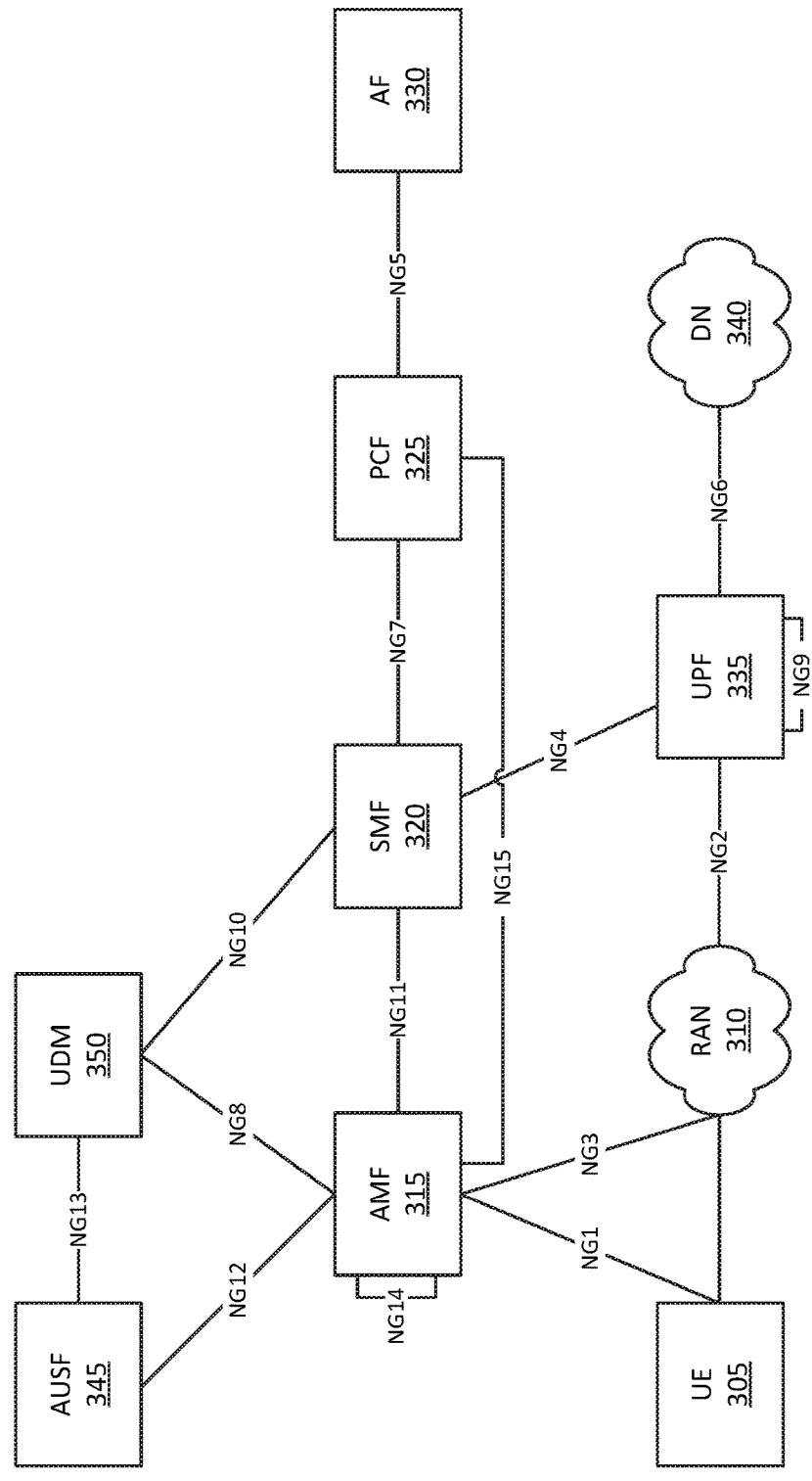
FIG. 3 illustrates an example environment in which one or more embodiments, described herein, may be implemented.

FIG. 3 illustrates an example environment 300, in which one or more embodiments, described herein, may be implemented. Environment 300 may be a 5G network, and/or may include elements of a 5G network.

As shown in FIG. 3, environment 300 may include UE 305, RAN 310, Access and Mobility Management Function ("AMF") 315, SMF 320, Policy Control Function ("PCF") 325, Application Function ("AF") 330, UPF 335, DN 340, Authentication Server Function ("AUSF") 345, and Unified Data Management ("UDM") 350.

The quantity of devices and/or networks, illustrated in FIG. 3, is provided for explanatory purposes only. In practice, environment 300 may include additional devices and/or networks; fewer devices and/or networks; different devices and/or networks; or differently arranged devices and/or networks than illustrated in FIG. 3. For example, while not shown, environment 300 may include devices that facilitate or enable communication between various components shown in environment 300, such as routers, modems, gateways, switches, hubs, etc. Alternatively, or additionally, one or more of the devices of environment 300 may perform one or more functions described as being performed by another one or more of the devices of environments 300. Devices of environment 300 may interconnect with each other and/or other devices via wired connections, wireless connections, or a combination of wired and wireless connections. In some implementations, one or more devices of environment 300 may be physically integrated in, and/or may be physically attached to, one or more other devices of environment 300.

UE 305 may include any computation and communication device that is capable of communicating with one or more networks (e.g., RAN 310 and/or DN 340). For example, user device 305 may include a device that receives content, such as web pages (e.g., that include text content and/or image content), streaming audio and/or video content, and/or other content, via an Internet connection and/or via some other delivery technique. In some implementations, user device 305 may be, may include, or may be a logical portion of, a radiotelephone, a personal communications system ("PCS") terminal (e.g., a device that combines a cellular radiotelephone with data processing and data communications capabilities), a personal digital assistant ("PDA") (e.g., a device that includes a radiotelephone, a pager, etc.), a smart phone, a laptop computer, a tablet computer, a camera, a television, a personal gaming system, a wearable device, and/or another type of computation and communication device.

RAN 310 may be, or may include, a 5G RAN that includes one or more base stations, via which UE 305 may communicate with one or more other elements of environment 200. UE 305 may communicate with RAN 310 via an air interface. For instance, RAN 310 may receive traffic (e.g., voice call traffic, data traffic, messaging traffic, signaling traffic, etc.) from UE 305 via the air interface, and may communicate the traffic to UPF 335, and/or one or more other devices or networks. Similarly, RAN 310 may receive traffic intended for UE 305 (e.g., from UPF 335, and/or one or more other devices or networks) and may communicate the traffic to UE 305 via the air interface.

AMF 315 may include one or more computation and communication devices that perform operations to register UE 305 with the 5G network, to establish bearer channels associated with a session with UE 305, to hand off UE 305 from the 5G network to another network, to hand off UE 305 from the other network to the 5G network, and/or to perform other operations. In some embodiments, the 5G network may include multiple AMFs 315, which communicate with each other via the NG14 interface (denoted in FIG. 3 by the line marked "NG14" originating and terminating at AMF 315).

SMF 320 may include one or more network devices that gather, process, store, and/or provide information in a manner described herein. SMF 320 may, for example, facilitate in the establishment of communication sessions on behalf of UE 305. In some embodiments, the establishment of communications sessions may be performed in accordance with one or more policies provided by PCF 325. As described herein, SMF 320 may also monitor parameters associated with traffic sent to and/or received from UE 305. For instance, SMF 320 may monitor resources consumed by UE 305 (e.g., voice call minutes used by UE 305, amounts of data sent and/or received by UE 305, quantities of messages (e.g., SMS, MMS, and/or other types of messages) sent and/or received by UE 305, or the like. SMF 320 may perform the monitoring by, for example, communicating with UPF 335 (e.g., via the NG4 interface) regarding user plane data that has been processed by UPF 335. As described herein, SMF 320 may receive information regarding URRs applied to traffic by one or more UPFs 335, in order to accurately track and calculate the actual usage of data that is handled by UPFs 335.

PCF 325 may include one or more devices that aggregate information to and from the 5G network and/or other sources. PCF 325 may receive information regarding policies and/or subscriptions from one or more sources, such as subscriber databases and/or from one or more users (such as, for example, an administrator associated with PCF 325).

AF 330 may include one or more devices that receive, store, and/or provide information that may be used in determining parameters (e.g., quality of service parameters, charging parameters, or the like) for certain applications. AF 330 may maintain the information on a per-application basis, in some embodiments.

UPF 335 may include one or more devices that receive, store, and/or provide data (e.g., user plane data). For example, UPF 335 may receive user plane data (e.g., voice call traffic, data traffic, etc.), destined for UE 305, from DN 340, and may forward the user plane data toward UE 305 (e.g., via RAN 310, SMF 320, and/or one or more other devices). In some embodiments, multiple UPFs 335 may be deployed (e.g., in different geographical locations), and the delivery of content to UE 305 may be coordinated via the NG9 interface (e.g., as denoted in FIG. 3 by the line marked "NG9" originating and terminating at UPF 335). Similarly, UPF 335 may receive traffic from UE 305 (e.g., via RAN 310, SMF 320, and/or one or more other devices), and may forward the traffic toward DN 340. In some embodiments, UPF 335 may communicate (e.g., via the NG4 interface) with SMF 320, regarding user plane data processed by UPF 335. As mentioned above, this information may aid SMF 320 in monitoring (e.g., tracking, counting, etc.) the traffic for particular subscribers.

As described herein, UPF 335 may add URR information to traffic (e.g., to header information, such as to GTP headers) when forwarding the traffic to another UPF 335. Additionally, UPF 335 may report URR information, when available, to SMF 320, regarding forwarded and/or dropped traffic. The URR information may aid SMF 320 in consolidating usage information, in order to accurately track and calculate the actual usage by multiple UPFs 335.

DN 340 may include one or more wired and/or wireless networks. For example, DN 340 may include an Internet Protocol ("IP")-based PDN, a wide area network ("WAN") such as the Internet, a private enterprise network, and/or one or more other networks. UE 305 may communicate, through DN 340, with data servers, application servers, other UEs 305, and/or to other servers or applications that are coupled to DN 340. DN 340 may be connected to one or more other networks, such as a public switched telephone network ("PSTN"), a public land mobile network ("PLMN"), and/or another network. DN 340 may be connected to one or more devices, such as content providers, applications, web servers, and/or other devices, with which UE 305 may communicate.

AUSF 345 and UDM 350 may include one or more devices that manage, update, and/or store, in one or more memory devices associated with AUSF 345 and/or UDM 350, profile information associated with a subscriber. AUSF 345 and/or UDM 350 may perform authentication, authorization, and/or accounting operations associated with the subscriber and/or a communication session with UE 305.

Figure 4:
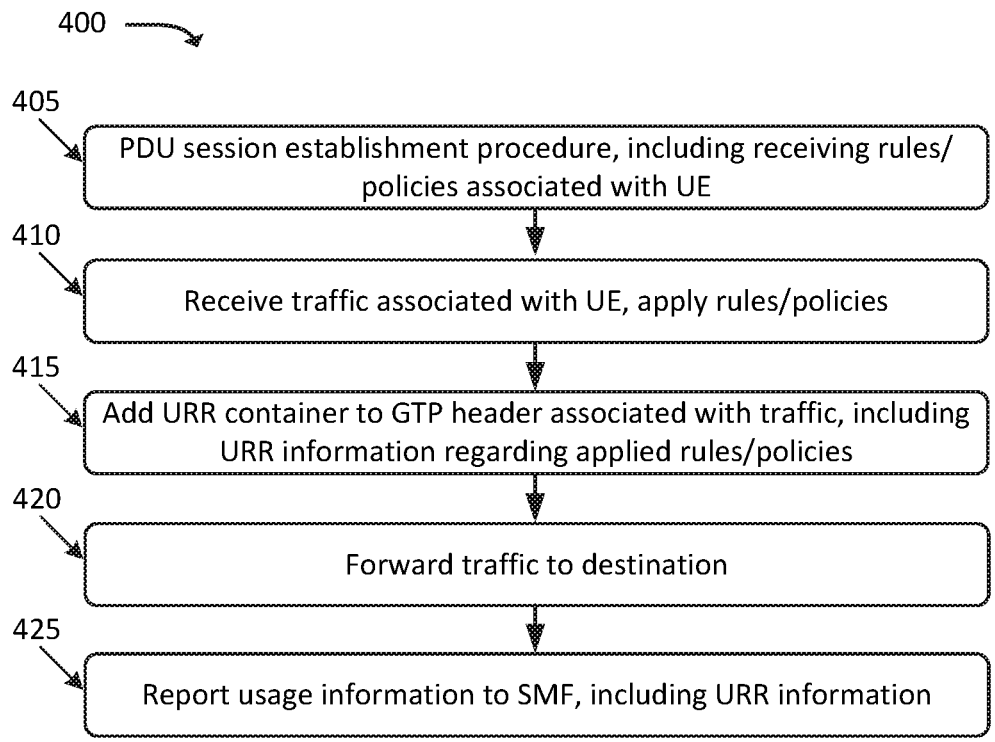
FIG. 4 illustrates an example process for reporting usage information according to a usage and reporting rule ("URR") associated with traffic handled by a UPF.

FIG. 4 illustrates an example process 400 for reporting usage information according to a URR associated with traffic handled by UPF 335. In some embodiments, process 400 may be performed when UPF 335 is the first UPF 335 in a chain of multiple UPFs 335 that handle traffic sent to, or received from UE 305.

Process 400 may include performing (at 405) a Protocol Data Unit ("PDU") session establishment procedure, including receiving rules and/or policies associated with a UE. For example, the PDU session may be requested by UE 305 and/or one or more other devices, and UPF 335 may receive URR information (e.g., from SMF 320, which may have received the information from PCF 325 and/or UDM 350). The URR information may indicate rules and/or policies regarding traffic to be dropped, and may further indicate how to report and/or count the usage (e.g., how, or whether, to count the usage associated with dropped packets). In some embodiments, the rules and/or policies, regarding traffic to be dropped, may indicate specific types of traffic to drop. As mentioned above, traffic "type" may be defined in a variety of ways. For example, traffic "type" may be determined based on a destination of the traffic (e.g., based on a destination IP and/or port, indicated in an IP header of the traffic), an application with which the traffic is associated (e.g., a voice call application, a video streaming application, a gaming application, etc.), a source of the traffic (e.g., based on a source IP and/or port, indicated in an IP header of the traffic), a protocol associated with the traffic (e.g., whether the traffic includes Session Initiation Protocol ("SIP") messages, Short Messaging Service ("SMS") messages, Multimedia Messaging Service ("MMS") messages, etc.), and/or some other attribute of the traffic that can be ascertained by UPF 335 (e.g., using DPI and/or some other technique).

Process 400 may also include receiving (at 410) traffic associated with the UE, and applying the rules and/or polices. As mentioned above, the traffic may not already include URR information (e.g., the traffic may not have been received via a GTP tunnel, and/or may not have been received from another UPF 335). UPF 335 may apply the rules and/or policies, which may include dropping traffic. In some embodiments, in order to determine which rules and/or policies apply to which traffic, UPF 335 may perform DPI to identify one or more traffic types in the received traffic.

Process 400 may further include adding (at 415) a URR container to a GTP header associated with the traffic, when forwarding the traffic to another UPF 335. As mentioned above, GTP tunnels may be used for communication between multiple UPFs 335, the use of which may include adding GTP header information to traffic sent from one UPF 335 to another. According to some embodiments, UPF 335 may include URR information (e.g., a URR identifier ("ID")) in GTP headers when forwarding data to another UPF 335.

As one example, traffic originating from one IP address may be treated according to a first URR, while traffic originating from another IP address may be treated according to a second URR. When forwarding first traffic, originating from the first IP address, UPF 335 may include a URR ID associated with the first URR in GTP headers associated with the first traffic; while when forwarding second traffic, originating from the second IP address, UPF 335 may include a URR ID associated with the second URR in GTP headers associated with the second traffic. An example arrangement of a GTP packet is described below with respect to FIGS. 5-7.

In some embodiments, UPF 335 may forgo adding URR information to the traffic in situations where UPF 335 does not add GTP headers to the traffic. For example, when UPF 335 does not forward the traffic to another UPF 335 (e.g., when UPF 335 forwards the traffic to DN 340), UPF 335 may not add URR information to the traffic itself.

Process 400 may also include forwarding (at 420) the traffic to a destination (e.g., another UPF 335). For instance, once the GTP headers, with the URR information, have been added to the traffic, UPF 335 may forward the traffic to another UPF 335.

Process 400 may additionally include reporting (at 420) usage information to SMF 320. When the traffic that is forwarded includes URR information, UPF 335 may also report the URR information. As further described below, similar processes may be performed by subsequent UPFs 335, with additional operations related to handling URR information in incoming traffic.

FIGS. 5-7 illustrate example header information that may be used to communicate URR information in GTP headers (e.g., from one UPF 335 to another). FIG. 5 illustrates an example G-PDU 505, which may include a T-PDU and a GTP-U header. The GTP-U header may include Tunnel Endpoint Identifier ("TEID"), sequence numbers, and/or other information that may facilitate the transmission of the G-PDU from one UPF 335 to another. The GTP-U header may include one or more extension headers 510. In some embodiments, as discussed below, URR information may be included by way of one or more extension headers 510.

FIG. 6 illustrates a general format for an extension header 605. As shown, the extension header may include information arranged in a set of bits, bytes, and/or other arrangements of information. In some embodiments, the information may be arranged as a set of octets (e.g., a set of 8 bits), where the first octet may indicate the length of the extension header (shown here as "m"), octets 2 through m−1 may include extension header content, and the last octet may indicate a next extension header type. In some embodiments, the length field may indicate the amount of data in the extension header (e.g., a quantity of octets), while in some embodiments the length field may indicate the length in some other way (e.g., as a multiple of the quantity of octets in extension header 605). For example, in some such embodiments, a length value of 2 may indicate 2 sets of octets, where each set of octets includes 4 octets (thus, the length value of 2 may indicate 8 octets). In some embodiments, the extension header may follow a different format without departing from the concepts described herein.

FIG. 7 illustrates an example URR container 705, which may be an implementation of extension header 605, in accordance with some embodiments. As shown, the length may be 4, which may indicate that URR container 705 is 4 octets long. Octets 2 and 3 may include URR information (e.g., one or more URR IDs), and octet 4 may include a value that indicates that the type (if any) of the next extension header included in the GTP-U header. In some embodiments, URR container 705 may be indicated (e.g., in a "next extension header type" field of a previous extension header) by the value 10000011, or by another suitable value.

Figure 8:
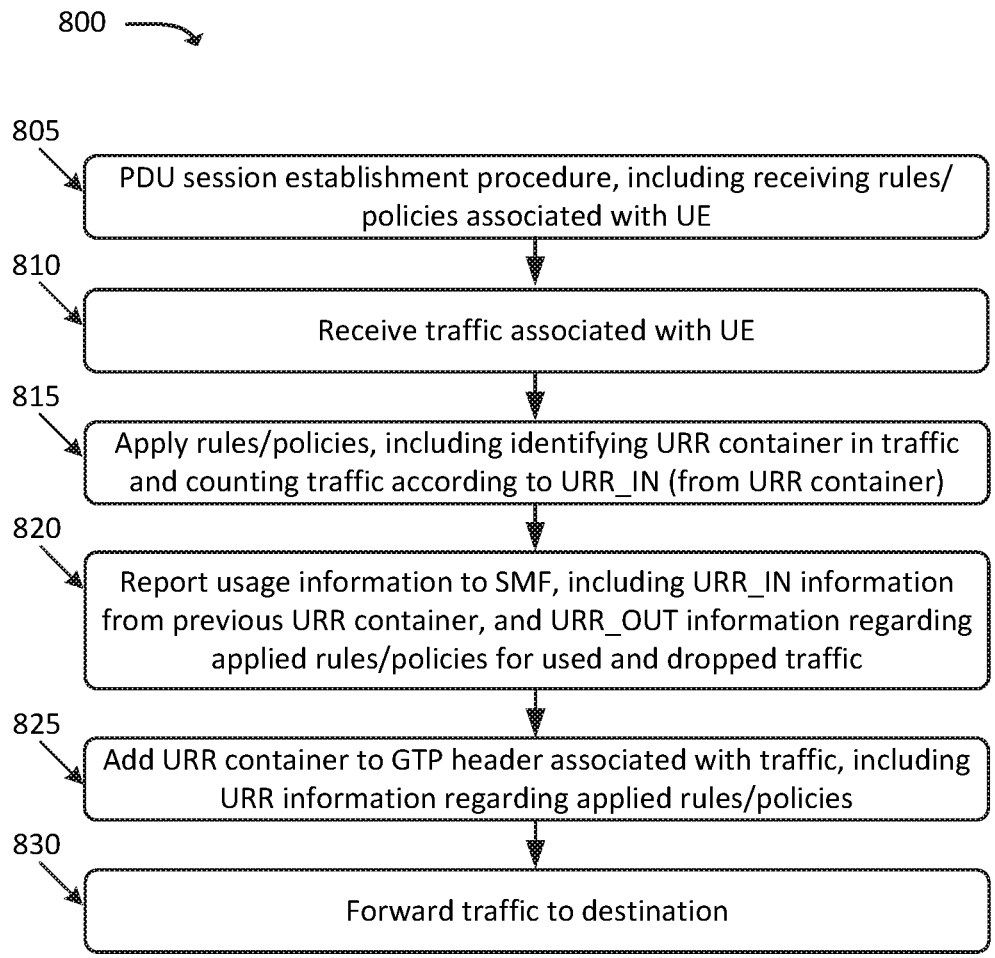
FIG. 8 illustrates another example process for reporting usage information according to (1) a URR associated with traffic handled by a UPF, as well as (2) a URR associated with the traffic handled by an upstream UPF.

FIG. 8 illustrates an example process 800 for reporting usage information according to a URR associated with traffic handled by UPF 335. In some embodiments, process

400 may be performed when UPF 335 is not the first UPF 335 in a chain of multiple UPFs 335 that handle traffic sent to, or received from UE 305.

As shown, process 800 may include performing (at 805) a session establishment procedure, including receiving rules and/or policies associated with a particular UE 305. In some embodiments, one or more of the rules and/or policies (e.g., URRs) may identify actions to be performed on traffic, based on URR information included in the traffic. For example, one URR (e.g., URR_A) may indicate a maximum bitrate ("MBR") for traffic that is marked with another URR (e.g., URR_B).

Process 800 may also include receiving (at 810) traffic associated with UE 305. For example, as mentioned above, UPF 335 may receive the traffic (e.g., via a GTP tunnel) from another UPF 335. As such, the traffic may include a GTP header with a URR container (e.g., as described above with respect to URR container 705).

Process 800 may further include applying (at 815) rules and/or policies on the traffic. For example, UPF 335 may drop some of the received traffic, based on one or more URRs executed by UPF 335. When applying rules and/or policies (e.g., dropping traffic), UPF 335 may store information indicating a URR_IN of the traffic (e.g., a URR as indicated in a URR container 705 by a previous UPF 335), as well as a URR_OUT based on which the traffic was dropped (e.g., a URR executed by UPF 335).

In this sense, traffic that is handled by UPF 335 may logically be associated with both a URR_IN and a URR_OUT. To reiterate, URR_IN refers to a set of URRs, indicated in a URR container added by a previous UPF 335, while URR_OUT refers to a set of URRs that are executed by UPF 335. Process 800 may further include reporting (at 820) usage information to SMF 320, including the URR_IN and URR_OUT. As described below, SMF 320 may consolidate the information received from multiple UPFs 335 in order to accurately track and calculate the usage by the UPFs 335.

As mentioned above, some URRs may reference other URRs. Continuing with the above example, assume that UPF 335 receives traffic marked with URR_B and URR_C. UPF 335 may, based on executing URR_A, drop some of the URR_B traffic. Further, since URR_A refers to URR_B, UPF 335 may not execute a rule and/or policy on the traffic marked with URR_C, based on URR_A (although UPF 335 may execute other rules and/or policies on the traffic marked with URR_C).

Process 800 may further include adding (at 825) adding a URR container to a GTP header, indicating the URR (or URRs) applied by UPF 335. As mentioned above, UPF 335 may forgo this block if UPF 335 is not adding a GTP header (e.g., if UPF 335 is not forwarding the traffic to another UPF 335). In some embodiments, UPF 335 may strip (e.g., remove) the previous GTP header prior to adding (at 825) the GTP header with the URR container. Process 800 may additionally including forwarding (at 830) the traffic to its destination (e.g., another UPF 335, DN 340, and/or another device or network).

Figure 9A:
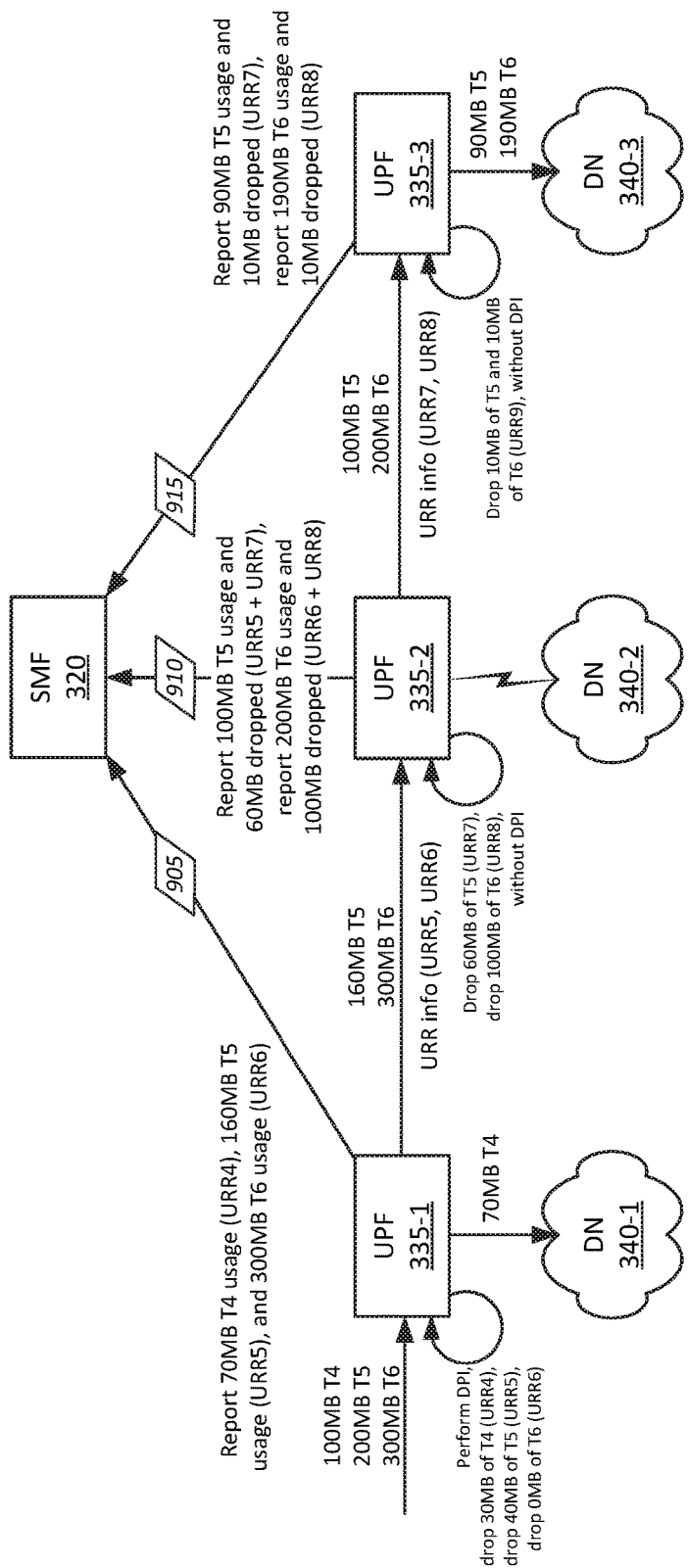
FIGS. 9A and 9B conceptually illustrate a use case, involving multiple UPFs, in which usage of multiple types of traffic may be accurately tracked and calculated.
Figure 9B:
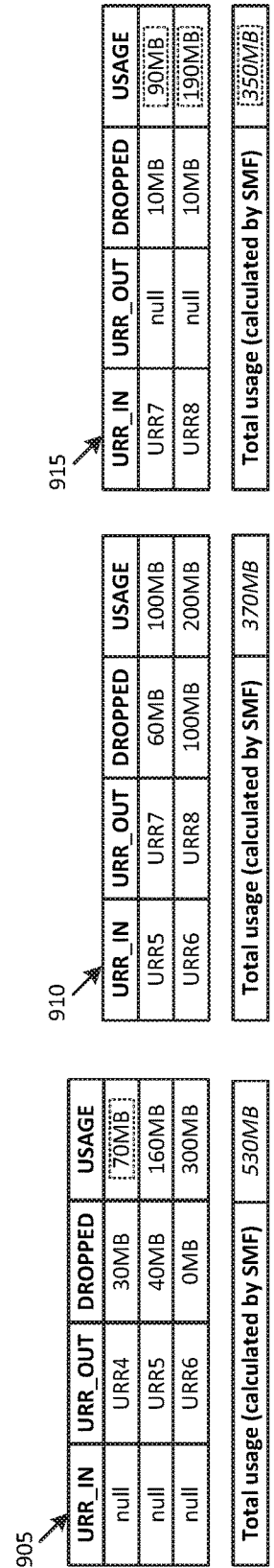

FIGS. 9A and 9B conceptually illustrate a scenario in which the usage of multiple types of traffic, handled by multiple UPFs 335, may be accurately tracked. As shown in FIG. 9A, UPF 335-1 may receive 600 MB of traffic. Specifically, UPF 335-1 may receive 100 MB of T4 traffic, 200 MB of T5 traffic, and 300 MB of T6 traffic. UPF 335-1 may perform DPI to identify these various types of traffic, and may execute URRs on the traffic. Specifically, according to URR4, UPF 335-1 may drop 30 MB of T4 traffic, and may also drop 40 MB of T5 traffic. UPF 335-1 may also forward the remaining T4 traffic (i.e., 70 MB) to DN 1.

UPF 335-1 may output a report 905 to SMF 320, indicating 70 MB T4 usage according to URR4, 160 MB T5 usage according to URR5, and 300 MB T6 usage according to URR6. FIG. 9B conceptually illustrates an example arrangement of report 905. As shown, data structure 905 may include the following fields: URR_IN, URR_OUT, DROPPED, and USAGE. Each row may correspond to a particular URR, or set of URRs (in this example, URR4, URR5, URR6, etc. each refer to a single URR, but in practice, URR4, URR5, URR6, etc. may each refer to a set of URRs).

The URR_IN field may be used to identify a URR (or set of URRs) that particular traffic was marked with (e.g., in scenarios where UPF 335 received the traffic via a GTP tunnel, such as from another UPF 335 that included URR information in GTP headers). In this example, the URR_IN field may have a "null" value, or some other value, indicating that there was no previous URR information when UPF 335-1 received the traffic. The URR_OUT field may indicate a URR (or set of URRs) applied by UPF 335-1 to particular traffic. The DROPPED field may indicate an amount of traffic that was dropped according to a particular URR (or set of URRs), while the USAGE field may indicate an amount of traffic that was treated according to a particular URR (or set of URRs), but was not dropped (e.g., was forwarded by UPF 335 to another device or network, such as to another UPF 335 or to DN 340).

As shown in this example, a first set of traffic (e.g., T4 traffic), which was treated by UPF 335-1 according to URR4, may be indicated as 30 MB DROPPED and 70 MB USAGE. Similarly, a second set of traffic (e.g., T5 traffic), which was treated by UPF 335-1 according to URR5, may be indicated as 40 MB DROPPED and 160 MB USAGE. Based solely on report 905, the information available to SMF 320 may indicate a total of 530 MB usage.

Returning to FIG. 9A, UPF 335-1 may output the T5 and T6 traffic to UPF 335-2. As discussed above, the traffic may be sent via one or more GTP tunnels, and may include GTP headers that indicate the respective URRs associated with the traffic (e.g., T5 traffic may include GTP headers that indicate that the traffic is associated with URR5, while T6 traffic may include GTP headers that indicate that the traffic is associated with URR6).

Once UPF 335-2 receives the traffic, UPF 335-2 may execute one or more URRs on the traffic. For example, UPF 335-2 may execute URR7, which may include rules and/or policies that reference URR5, and may execute URR8, which may include rules and/or policies that reference URR6. That is, URR7 may indicate that some portion of traffic, which was marked as being associated with URR5, should be dropped, while URR8 may indicate that some portion of traffic, which was marked as being associated with URR6, should be dropped.

URRs that reference other URRs (such as URR7 and URR8, which respectively reference URR5 and URR6) may allow different types of traffic to be handled differently, without necessitating that DPI be performed. For instance, while UPF 335-1 may have needed to perform DPI to distinctly identify T5 and T6 traffic, UPF 335-2 may be able to identify these different traffic types based on the URR markings in the GTP headers, and without performing DPI on an IP header or IP payload of the packets.

As shown, UPF 335-2 may drop 60 MB of T5 traffic according to URR7, and may drop 100 MB of T6 traffic according to URR8. UPF 335-2 may provide report 910 to SMF regarding the usage and the dropping of the traffic. Referring to FIG. 9B, an example arrangement of report 910 is shown. The first row may indicate a URR_IN of URR5, and a URR_OUT of URR7. That is, UPF 335-1 may track that 60 MB of traffic, marked with URR5, was dropped by UPF 335-2 in accordance with URR7. UPF 335-2 may also track that 100 MB of traffic, marked with URR5, was forwarded in accordance with URR7. Similarly, UPF 335-2 may have tracked that 100 MB of traffic, marked with URR6, was dropped and 200 MB of the traffic, marked with URR6, was forwarded in accordance with URR8.

Based on reports 905 and 910, SMF 320 may determine that the total usage is 370 MB. For example, SMF 320 may determine that the usage reported by UPF 335-1 with regard to URR5 traffic (URR_OUT:URR5 in report 905) should be reduced by 60 MB, based on the DROPPED field in report 910 (i.e., the DROPPED field with URR_IN:URR5). Generally speaking, SMF 320 may match the URR_IN of a downstream UPF with the URR_OUT of an upstream UPF, in order to correlate the handling of traffic by the two UPFs.

Referring back to FIG. 9A, UPF 335-2 may forward 100 MB of T5 traffic (e.g., traffic which was marked with URR5 by UPF-1) to UPF 335-3, and may indicate, in a GTP header, that the traffic has been treated according to URR7. Similarly, UPF 335-2 may forward 200 MB of T6 traffic (e.g., traffic which was marked with URR6 by UPF-1) to UPF 335-3, and may indicate, in a GTP header, that the traffic has been treated according to URR8.

Assume that UPF 335-3 is associated with URR9, in which traffic is dropped without regard to content, type, or other differentiating characteristics (e.g., an AMBR policy). According to URR9, UPF 335-3 may drop 10 MB of T5 traffic and 10 MB of T6 traffic. Again, due to the URR information provided by UPF 335-2, UPF 335-3 may be able to identify which traffic was dropped (even if UPF 335-3 does not use such information in determining which traffic to drop). UPF 335-3 may forward the T5 and T6 traffic to DN 340-3, and may output report 915 to SMF 320 regarding the usage and the dropped traffic.

As shown in FIG. 9B, report 915 may indicate that 10 MB of traffic, marked with URR7, was dropped, and 90 MB of the traffic was used (e.g., forwarded by UPF 335-3). Report 915 may also indicate that 10 MB of traffic, marked with URR8, was dropped and that 190 MB of the traffic was used.

Based on reports 905, 910, and 915, SMF 320 may determine that the total usage is 350 MB. For example, SMF 320 may determine that the usage reported by UPF 335-2 with regard to URR7 traffic (URR_OUT:URR7 in report 910) should be reduced by 10 MB, based on the DROPPED field in report 915 (i.e., the DROPPED field with URR_IN: URR7), and that the usage reported by UPF 335-2 with regard to URR8 traffic (URR_OUT:URR8 in report 915) should also be reduced by 10 MB. Further note that the USAGE associated with URR_OUT:URR4 (in report 905) may be counted, in this example, due to no further dropping of traffic that was marked with URR4.

The dashed boxes, in FIG. 9B, indicate the final usage calculations in this example (e.g., per traffic type). Further note that while traffic types (e.g., T4, T5, and T6) are shown in FIG. 9A, these traffic types are shown for illustrative purposes only, and UPFs 335-2 and 335-3 need not be "aware" of these types. That is, in this example, assuming UPF 335-1 performs DPI in order to determine traffic type, UPF 335-2 handles traffic based on URR information from UPF 335-1, while UPF 335-3 indiscriminately handles traffic (i.e., without regard to traffic type or URR information from UPF 335-2).

FIGS. 10A and 10B illustrate another example scenario in which usage can be accurately tracked and calculated. Some of the operations and concepts shown in FIGS. 10A and 10B are similar to those shown in FIGS. 9A and 9B, and are not described again in detail below. As shown in FIG. 10A, UPF 335-1 may perform the same operations as shown in FIG. 9A, and may provide the same report 905 to SMF 320.

UPF 335-2 may execute a URR whereby traffic is dropped without regard to traffic type or URR information (e.g., an AMBR rule and/or policy). For instance, UPF 335-2 may drop 60 MB of T5 traffic and 100 MB of T6 traffic in accordance with URR10. This dropping may be performed in a random manner and/or some other manner that does not distinguish between traffic types.

UPF 335-2 may provide a report 920 to SMF 320, indicating how much traffic was dropped and how much traffic was used. As shown in FIG. 10B, report 920 may indicate that 60 MB of traffic, marked with URR5 (e.g., T5 traffic) was dropped according to URR10. Report 920 may also indicate that 100 MB of traffic, marked with URR6 (e.g., T6 traffic) was dropped according to URR10.

Since both the T5 traffic and the T6 traffic are marked with URR10 (e.g., in GTP headers) by UPF 335-2, UPF 335-3 may not be able to differentiate between the different traffic types. As shown in FIG. 10A, UPF 335-3 may drop 20 MB of the received traffic, which consists of (essentially) a mix of T5 traffic and T6 traffic, and may forward 280 MB of the traffic (e.g., 90 MB of T5 traffic and 180 MB of T6 traffic) to DN 340-3.

UPF 335-3 may send a report 925 to SMF 320 indicating the dropping of 20 MB of traffic and forwarding of 180 MB of traffic. As shown in FIG. 10B, although UPF 335-3 may not be able to provide (via report 925) information that indicates which traffic was dropped, UPF 335-3 may still be able to provide information indicating that 10 MB of traffic, marked with URR10, was dropped, and that 280 MB of the traffic was forwarded (e.g., used) by UPF 335-3.

SMF 320 may be able to trace back the 280 MB of usage, associated with traffic marked with URR10, to traffic that was marked with URR5 and URR6. Specifically, for instance, SMF 320 may identify that URR_IN:URR10 (in report 925) corresponds to the two rows in report 920, which indicate URR_OUT:URR10, and either URR_IN:URR5 or URR_IN:URR6. Thus, SMF 320 may still be able to accurately track the total usage consumed at UPF 335-3, as well as being able to track (in this scenario) the specific amount of usage associated with T4 traffic.

Figure 11:
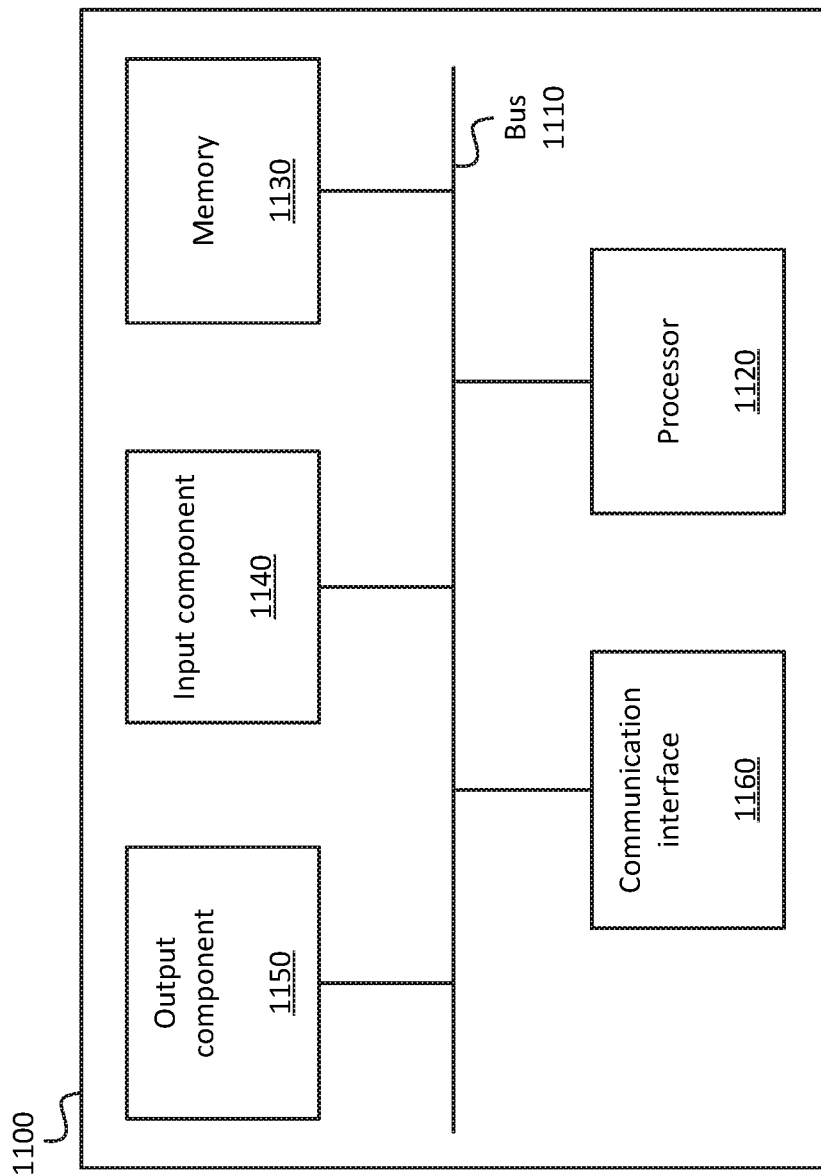
FIG. 11 illustrates example components of one or more devices, according to one or more embodiments described herein.

FIG. 11 illustrates example components of device 1100. One or more of the devices described above may include one or more devices 1100. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100, such as a keyboard, a keypad, a button, a switch, etc. Output component 1150 may include a mechanism that outputs information to the operator, such as a display, a speaker, one or more light emitting diodes ("LEDs"), etc. Input component 1140 may include one or more input devices and/or sensors.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described with regard to FIGS. 1-2B, 4, and 8-10B and 5, the order of the blocks may be modified in other implementations. Further, non-dependent blocks may be performed in parallel. Additionally, while the figures have been described in the context of particular devices performing particular acts, in practice, one or more other devices may perform some or all of these acts in lieu of, or in addition to, the above-mentioned devices.

Additionally, while some examples are described in the context of upstream traffic (e.g., traffic sent from a UE), similar concepts may apply to downstream traffic (e.g., traffic sent to a UE). Further still, while example formats of reports were described above with respect to FIGS. 9B and 10B, in some embodiments, the reports may include additional, less, or differently arranged information.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. To the extent that the term "greater than" (or similar terms) is used herein to describe a relationship of a value to a threshold, it is to be understood that the term "greater than or equal to" (or similar terms) could be similarly contemplated, even if not explicitly stated. Similarly, to the extent that the term "less than" (or similar terms) is used herein to describe a relationship of a value to a threshold, it is to be understood that the term "less than or equal to" (or similar terms) could be similarly contemplated, even if not explicitly stated. Further, the term "satisfying," when used in relation to a threshold, may refer to "being greater than a threshold," "being greater than or equal to a threshold," "being less than a threshold," "being less than or equal to a threshold," or other similar terms, depending on the appropriate context.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A network device, comprising:
a non-transitory computer-readable medium storing a set of processor-executable instructions; and
one or more processors configured to execute the set of processor-executable instructions, wherein executing the set of processor-executable instructions causes the one or more processors to:
receive, by the network device, traffic via a General Packet Radio Service ("GPRS") Tunneling Protocol ("GTP") tunnel;
identify, by the network device, without performing deep packet inspection ("DPI"), that:
a first set of traffic, included in the traffic received via the GTP tunnel, is a first type of traffic, and
a second set of traffic, included in the traffic received via the GTP tunnel, is a second type of traffic;
forward, by the network device, to one or more other devices, and in accordance with a particular rule, only a first subset of the first type of traffic and only a second subset of the second type of traffic; and
report, by the network device and to a second network device of the wireless telecommunications network:
a first amount of the first type of traffic, in the first subset, that was forwarded by the network device,
a second amount of the second type of traffic, in the second subset, that was forwarded by the network device, and
an indication of the particular rule that was used to forward only the first subset of the first type of traffic and only the second subset of the second type of traffic.

2. The network device of claim 1, wherein the network device is a first User Plane Function ("UPF") of a wireless telecommunications network, and wherein the traffic is received via the GTP tunnel from a second UPF of the telecommunications network.

3. The network device of claim 2, wherein the second UPF drops at least some traffic of the first type of traffic before providing the traffic to the first UPF.

4. The network device of claim 2,
wherein at least some of the first type of traffic has been dropped by the second UPF, in accordance with a first set of rules, before providing the traffic to the first UPF, and
wherein at least some of the second type of traffic has been dropped by the second UPF, in accordance with a second set of rules, before providing the traffic to the first UPF,
wherein the report by the first UPF allows the other network device to determine:
a first usage amount, of the first type of traffic, that was used across the first and second UPFs, and
a second usage amount, of the second type of traffic, that was used across the first and second UPFs.

5. The network device of claim 1, wherein the GTP tunnel is a first GTP tunnel, wherein executing the processor-executable instructions, to forward the first and second subsets of the first and second types of traffic, respectively, further causes the one or more processors to:
forward the first and second subsets of the first and second types of traffic, respectively, via a second GTP tunnel, in conjunction with GTP header information identifying the particular rule.

6. The network device of claim 1, wherein the particular rule is a first rule, wherein the network device is a first User Plane Function ("UPF") of a wireless telecommunications network,
wherein executing the processor-executable instructions, to identify that the first set of traffic is the first type of traffic, further causes the one or more processors to identify that the first type of traffic is associated with a second rule that has been applied by a second UPF of the wireless telecommunications network before the first UPF receives the first set of traffic, and
wherein executing the processor-executable instructions, to identify that the first set of traffic is the first type of traffic, further causes the one or more processors to identify that the first type of traffic is associated with a second rule that has been applied by a second UPF before the first UPF receives the first set of traffic.

7. The network device of claim 1, wherein the network device is a first User Plane Function ("UPF") of a wireless telecommunications network,
wherein executing the processor-executable instructions, to identify that the first set of traffic is the first type of traffic, further causes the one or more processors to identify that the first type of traffic is associated with a second rule that has been applied by a second UPF of the wireless telecommunications network before the first UPF receives the first set of traffic, and
wherein executing the processor-executable instructions, to identify that the first set of traffic is the first type of traffic, further causes the one or more processors to identify that the first type of traffic is associated with a second rule that has been applied by the second UPF before the first UPF receives the first set of traffic.

8. A non-transitory computer-readable medium, storing a set of processor-executable instructions, which, when executed by one or more processors of a network device, cause the one or more processors to:
receive traffic via a General Packet Radio Service ("GPRS") Tunneling Protocol ("GTP") tunnel;
identify, without performing deep packet inspection ("DPI"), that:
a first set of traffic, included in the traffic received via the GTP tunnel, is a first type of traffic, and
a second set of traffic, included in the traffic received via the GTP tunnel, is a second type of traffic;
forward, to one or more other devices and in accordance with a particular rule, only a first subset of the first type of traffic and only a second subset of the second type of traffic; and
report, to a second network device of the wireless telecommunications network:
a first amount of the first type of traffic, in the first subset, that was forwarded by the network device,
a second amount of the second type of traffic, in the second subset, that was forwarded by the network device, and
an indication of the particular rule that was used to forward only the first subset of the first type of traffic and only the second subset of the second type of traffic.

9. The non-transitory computer-readable medium of claim 8, wherein the traffic is received via the GTP tunnel from a User Plane Function ("UPF") of the telecommunications network.

10. The non-transitory computer-readable medium of claim 9, wherein the UPF drops at least some traffic of the first type of traffic before providing the traffic to the network device.

11. The non-transitory computer-readable medium of claim 9,
wherein at least some of the first type of traffic has been dropped by the UPF, in accordance with a first set of rules, before providing the traffic to the network device, and
wherein at least some of the second type of traffic has been dropped by the UPF, in accordance with a second set of rules, before providing the traffic to the network device,
wherein the report by the network device allows the other network device to determine:
a first usage amount, of the first type of traffic, that was used across the network device and the UPF, and
a second usage amount, of the second type of traffic, that was used across the network device and the UPF.

12. The non-transitory computer-readable medium of claim 8, wherein the GTP tunnel is a first GTP tunnel, wherein executing the processor-executable instructions, to forward the first and second subsets of the first and second types of traffic, respectively, further causes the one or more processors to:
forward the first and second subsets of the first and second types of traffic, respectively, via a second GTP tunnel, in conjunction with GTP header information identifying the particular rule.

13. The non-transitory computer-readable medium of claim 8, wherein the particular rule is a first rule,
wherein executing the processor-executable instructions, to identify that the first set of traffic is the first type of traffic, further causes the one or more processors to identify that the first type of traffic is associated with a second rule that has been applied by a User Plane Function ("UPF") of the wireless telecommunications network before the network device receives the first set of traffic, and
wherein executing the processor-executable instructions, to identify that the first set of traffic is the first type of traffic, further causes the one or more processors to identify that the first type of traffic is associated with a second rule that has been applied by the UPF before the network device receives the first set of traffic.

14. The non-transitory computer-readable medium of claim 8,
wherein executing the processor-executable instructions, to identify that the first set of traffic is the first type of traffic, further causes the one or more processors to identify that the first type of traffic is associated with a second rule that has been applied by a User Plane Function ("UPF") of the wireless telecommunications network before the network device receives the first set of traffic, and
wherein executing the processor-executable instructions, to identify that the first set of traffic is the first type of traffic, further causes the one or more processors to identify that the first type of traffic is associated with a second rule that has been applied by the UPF before the network device receives the first set of traffic.

15. A method, comprising:
receiving, by a network device, traffic via a General Packet Radio Service ("GPRS") Tunneling Protocol ("GTP") tunnel;
identifying, by the network device, and without performing deep packet inspection ("DPI"), that:
a first set of traffic, included in the traffic received via the GTP tunnel, is a first type of traffic, and
a second set of traffic, included in the traffic received via the GTP tunnel, is a second type of traffic;
forwarding, by the network device, to one or more other devices, and in accordance with a particular rule, only a first subset of the first type of traffic and only a second subset of the second type of traffic; and
reporting, by the network device and to a second network device of the wireless telecommunications network:
a first amount of the first type of traffic, in the first subset, that was forwarded by the network device,
a second amount of the second type of traffic, in the second subset, that was forwarded by the network device, and
an indication of the particular rule that was used to forward only the first subset of the first type of traffic and only the second subset of the second type of traffic.

16. The method of claim 15, wherein the traffic is received via the GTP tunnel from a User Plane Function ("UPF") of the telecommunications network.

17. The method of claim 16,
wherein at least some of the first type of traffic has been dropped by the UPF, in accordance with a first set of rules, before providing the traffic to the network device, and
wherein at least some of the second type of traffic has been dropped by the UPF, in accordance with a second set of rules, before providing the traffic to the network device,
wherein the report by the network device allows the other network device to determine:
a first usage amount, of the first type of traffic, that was used across the network device and the UPF, and
a second usage amount, of the second type of traffic, that was used across the network device and the UPF.

18. The method of claim 15, wherein the GTP tunnel is a first GTP tunnel, wherein forwarding the first and second subsets of the first and second types of traffic, respectively, includes:
forwarding the first and second subsets of the first and second types of traffic, respectively, via a second GTP tunnel, in conjunction with GTP header information identifying the particular rule.

19. The method of claim 15, wherein the particular rule is a first rule,
wherein identifying that the first set of traffic is the first type of traffic includes identifying that the first type of traffic is associated with a second rule that has been applied by a User Plane Function ("UPF") of the wireless telecommunications network before the network device receives the first set of traffic, and
wherein identifying that the first set of traffic is the first type of traffic includes identifying that the first type of traffic is associated with a second rule that has been applied by the UPF before the network device receives the first set of traffic.

20. The method of claim 15,
wherein identifying that the first set of traffic is the first type of traffic includes identifying that the first type of traffic is associated with a second rule that has been applied by a User Plane Function ("UPF") of the wireless telecommunications network before the network device receives the first set of traffic, and wherein identifying that the first set of traffic is the first type of traffic includes identifying that the first type of traffic is associated with a second rule that has been applied by the UPF before the network device receives the first set of traffic.

* * * * *